United States Patent
Henninger et al.

(10) Patent No.: US 8,168,745 B2
(45) Date of Patent: May 1, 2012

(54) PROCESS FOR THE PREPARATION OF POLY- AND OLIGOTHIOPHENES ON AN INDUSTRIAL SCALE

(75) Inventors: Björn Henninger, Köln (DE); Frank Rauscher, Köln (DE); Leslaw Mleczko, Dormagen (DE)

(73) Assignee: Bayer Technology Services GmbH, Leverkusen (DE)

( * ) Notice: Subject to any disclaimer, the term of this patent is extended or adjusted under 35 U.S.C. 154(b) by 180 days.

(21) Appl. No.: 12/665,917

(22) PCT Filed: Jul. 23, 2008

(86) PCT No.: PCT/EP2008/006026
§ 371 (c)(1),
(2), (4) Date: Jan. 6, 2010

(87) PCT Pub. No.: WO2009/015810
PCT Pub. Date: Feb. 5, 2009

(65) Prior Publication Data
US 2010/0190954 A1    Jul. 29, 2010

(30) Foreign Application Priority Data
Aug. 2, 2007   (DE) .......................... 10 2007 036 593

(51) Int. Cl.
*C08G 75/00*    (2006.01)

(52) U.S. Cl. .......................... 528/380; 528/377; 528/378

(58) Field of Classification Search .................. 528/380, 528/377, 378
See application file for complete search history.

(56) References Cited

U.S. PATENT DOCUMENTS

| | | | |
|---|---|---|---|
| 4,521,589 A | 6/1985 | Yamamoto et al. | |
| 5,756,653 A | 5/1998 | Rieke | |
| 6,191,315 B1 | 2/2001 | Thankachan et al. | |
| 6,602,974 B1 | 8/2003 | McCullough et al. | |

FOREIGN PATENT DOCUMENTS

| | | |
|---|---|---|
| EP | 1 026 138 A2 | 8/2000 |
| EP | 1 028 136 A | 8/2000 |
| WO | 2005/014961 A | 2/2005 |
| WO | 2006/084545 A | 8/2006 |
| WO | 2008/092490 A | 8/2008 |

OTHER PUBLICATIONS

Iraqi et al., "Synthesis and Characterisation of Telechelic Regioregular Head-to-tail Poly (3-alkylthiophenes)", J. Mater. Chem. vol. 8, No. 1 p. 25-29, (1998).
Loewe et al., "A Simple Method to Prepare Head-to-Tail Coupled, Regioregular Poly (3-alkylthiophenes) Using Grignard Metathesis**", Communications, Adv. Mater. vol. 11, No. 3, p. 250-253, 1999.

*Primary Examiner* — Randy Gulakowski
*Assistant Examiner* — Shane Fang
(74) *Attorney, Agent, or Firm* — Norris McLaughlin & Marcus PA

(57) ABSTRACT

Process for industrial scale synthesis of poly- and oligothiophenes, which works in concentrated solution. In this process, a solution which comprises an organometallic thiophene reagent is added to a second solution which comprises a catalyst.

14 Claims, No Drawings

PROCESS FOR THE PREPARATION OF POLY- AND OLIGOTHIOPHENES ON AN INDUSTRIAL SCALE

This is a 371 of PCT/EP2008/006026 filed 23 Jul. 2008 (international filing date), which claims foreign priority benefit under 35 U.S.C. §119 of German Patent Application No. 10 2007 036 593.6 filed Aug. 2, 2007

The present invention relates to a process for preparing oligo/polythiophenes.

BACKGROUND OF THE INVENTION

In the last 15 years, the field of molecular electronics has developed rapidly with the discovery of organic conductive and semiconductive compounds. In this time, a multitude of compounds which have semiconductive or electrooptical properties has been found. It is the general understanding that molecular electronics will not displace conventional semiconductor units based on silicon. Instead, it is assumed that molecular electronic components will open up new fields of use in which suitability for coating large areas, structural flexibility, processability at low temperatures and low costs are required. Semiconductive organic compounds are currently being developed for fields of application such as organic field-effect transistors (OFETs), organic luminescent diodes (OLEDs), sensors and photovoltaic elements. Simple structuring and integration of OFETs into integrated organic semiconductor circuits makes possible inexpensive solutions for smart cards or price tags, which have not been realizable to date with the aid of silicon technology owing to the cost and the lack of flexibility of the silicon units. It would likewise be possible to use OFETs as switching elements in large-scale flexible matrix displays.

All compounds have continuous conjugated units and are divided into conjugated polymers and conjugated oligomers according to the molecular weight and structure. Oligomers are generally distinguished from polymers in that oligomers usually have a narrow molecular weight distribution and a molecular weight up to about 10 000 g/mol (Da), whereas polymers generally have a correspondingly higher molecular weight and a broader molecular weight distribution. However, it is more sensible to distinguish by the number of repeat units, since a monomer unit can quite possibly reach a molecular weight of 300 to 500 g/mol, as, for example, in the case of (3,3''''-dihexyl) quarterthiophene. In the case of a distinction by the number of repeat units, reference is still made to oligomers in the range of 2 to about 20. However, there is a fluid transition between oligomers and polymers. Often, the difference in the processing of these compounds is also expressed with the distinction between oligomers and polymers. Oligomers are frequently evaporable and can be applied to substrates by means of vapour deposition processes. Irrespective of their molecular structure, polymers frequently refer to compounds which are no longer evaporable and are therefore generally applied by means of other processes.

An important prerequisite for the production of high-value organic semiconductor circuits is compounds of extremely high purity. In semiconductors, order phenomena play an important role. Hindrance of uniform alignment of the compounds and development of particle boundaries lead to a dramatic decline in the semiconductor properties, such that organic semiconductor circuits which have been constructed using compounds not of extremely high purity are generally unusable. Remaining impurities can, for example, inject charges into the semiconductive compound ("doping") and hence lower the on/off ratio or serve as charge traps and hence drastically lower the mobility. In addition, impurities can initiate the reaction of the semiconductive compounds with oxygen, and oxidizing impurities can oxidize the semiconductive compounds and hence shorten possible storage, processing and operating times.

The most important semiconductive poly- or oligomers include the poly/oligothiophenes whose monomer unit is, for example, 3-hexylthiophene. In the linkage of individual or plural thiophene units to form a polymer or oligomer, it is necessary in principle to distinguish two processes—the single coupling reaction and the multiple coupling reaction in the sense of a polymerization mechanism.

In the single coupling reaction, generally two thiophene derivatives with identical or different structure are coupled with one another in one step, so as to form a molecule which then consists of in each case one unit of the two starting materials. After a removal, purification and another functionalization, this new molecule may in turn serve as a monomer and thus open up access to longer-chain molecules. This process leads generally to exactly one oligomer, the target molecule, and hence to a product with no molar mass distribution and a low level of by-products. It also offers the possibility of building up very defined block copolymers through the use of different starting materials. A disadvantage here is that molecules which consist of more than 2 monomer units can be prepared only in a very complicated manner merely owing to the purification steps and the economic outlay can be justified only for processes with very high quality demands on the product.

One process for synthesizing oligo/polythiophenes is described in EP 1 026 138. In the actual polymerization, a regioselectively prepared Grignard compound is used as the monomer (X=halogen, R=substituent):

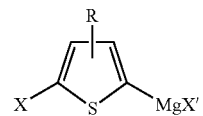

For the polymerization, the polymerization in a catalysis cycle is started by the Kumada method (cross-coupling metathesis reaction) with the aid of a nickel catalyst (preferably Ni(dppp)Cl$_2$).

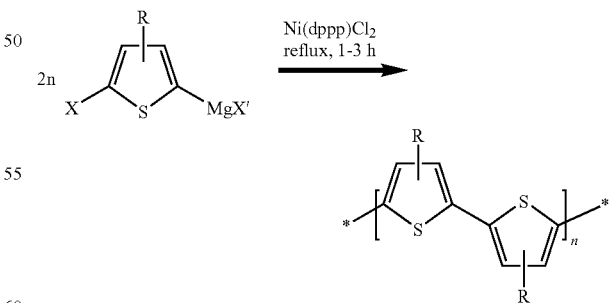

The polymers are generally obtained in the necessary purity via Soxhlet purifications.

In EP 1 026 138, the reaction is effected in such a way that first (as quantitatively as possible) the Grignard reaction is prepared and then the thiophene is polymerized with C—C bond formation by adding the nickel catalyst. Similar processes can be found, inter alia, in U.S. Pat. No. 4,521,589 and in Loewe et. al., Advanced Materials 1999, 11, No. 3, p. 250-253 and Iraqi et al., Journal of Materials Chemistry, 1998, 8(1), p. 25-29.

However, the processes described in EP 1 026 138 and in the further literature are purely laboratory processes. For example, in the examples from EP 1 028 136, the reaction solution has a concentration of monomers of about 4-6% by weight and hence a maximum product concentration, for example for the poly-3-hexylthiophene, of 2-3% by weight. The amount of production is increased only by the enlargement of the batch, as described, for example, in Example 2 of EP 1 028 136.

However, such a procedure has the disadvantage that it can frequently barely be used, especially in industrial processes, since the large amounts of solvent frequently prevent an economically viable process. The two-stage process likewise has to be viewed very critically from a safety point of view, since the reaction is started or, better described, ignited a) by the direct addition/mixing of the complete amounts in the Grignard synthesis step or b) also in that case when the catalyst is added.

In many applications, the sole means of control here is through the heat control through the reactor jacket. On an industrial scale, there is the risk of uncontrolled runaway of the reaction owing to the significantly poorer heat removal performance with growing reactor size. In particular, an increase in concentration to enhance the economic viability of the process constitutes a problem in this connection.

Proceeding from the prior art mentioned, it was therefore an object of the present invention to provide a process which at least partly overcomes the disadvantages mentioned and enables the industrial scale preparation of polythiophenes or oligothiophenes with defined mean chain lengths and a narrow molecular weight distribution.

SUMMARY OF THE INVENTION

This object is achieved by a process for polymerization, usable on the industrial scale, of at least one thiophene derivative having at least two leaving groups, the polymerization proceeding by means of an organometallic thiophene compound and of at least one catalyst, characterized in that a first solution which comprises the at least one organometallic thiophene compound is metered into a second solution which comprises the at least one catalyst, where the polymer concentration defined by the concentration of the two solutions (at 100% conversion) is at least 5% by weight.

DETAILED DESCRIPTION

It has been found that, surprisingly, in such polymerizations of thiophene derivatives by means of the process according to the invention, in many applications of the present invention, a polymer can be prepared with a very high regioselectivity and narrow molar mass distribution, while, at the same time, the concentration of reactant and product can be made significantly greater than in known syntheses. As a result, in many applications of the present invention, the possibility is opened up of preparing polythiophenes industrially in a considerably simplified manner.

In the context of the invention, the expression "the polymer concentration defined by the concentration of the two solutions (at 100% conversion)" means, in particular, the concentration of polymer which is present at 100% conversion (which is usually hypothetical in the specific applications), or would be present when the first solution is added completely to the second solution.

Preferably, the polymer concentration defined by the concentration of the two solutions (at 100% conversion) is $\geq 6\%$, preferably $\geq 9\%$, more preferably $\geq 10\%$.

In the context of the present invention, the term "thiophene derivative" is understood to mean both mono-, di- or polysubstituted thiophene and unsubstituted thiophene. Preference is given to thiophene derivatives which are alkyl-substituted, particular preference to 3-alkyl-substituted thiophene derivatives.

In the context of the present invention, the term "leaving group" is understood especially to mean any group which is capable of reacting by means of a metal or an organometallic compound to form an organometallic thiophene compound. Particularly preferred leaving groups are halogens, sulphates, sulphonates and diazo groups.

In a preferred embodiment of the invention, the at least one thiophene derivative contains at least two different leaving groups. This can be useful for the achievement of a better regioselectivity of the polymer in many applications of the present invention.

In an alternative preferred embodiment of the invention, the leaving groups of the at least one thiophene derivative are identical.

In the context of the present invention, the term "organometallic thiophene compound" is understood to mean especially a compound in which at least one metal-carbon bond to one of the carbon atoms on the thiophene heterocycle is present.

The term "organometallic compound" is understood to mean especially an organometallic alkyl-metal compound.

Preferred metals within the at least one organometallic thiophene compound are tin, magnesium, zinc and boron. It is pointed out that boron is likewise considered as a metal within the present invention. In the case that the process according to the invention proceeds with the involvement of boron, the leaving group is preferably selected from the group comprising MgBr, MgI, MgCl, Li or mixtures thereof.

The organometallic compounds which are used in the process according to the invention are preferably organometallic tin compounds, for example tributyltin chloride, or zinc compounds, for example activated zinc (Zn*), or borane compounds, for example $B(OMe)_3$ or $B(OH)_3$, or magnesium compounds, more preferably organometallic magnesium compounds, more preferably Grignard compounds of the formula R—Mg—X, where R is alkyl, most preferably C2-alkyl, and X is halogen, more preferably Cl, Br or I, and especially Br.

The term "catalyst" is understood to mean especially a catalytically active metal compound.

In a preferred embodiment of the invention, the at least one catalyst comprises nickel and/or palladium. This has been found to be favourable in many application examples of the present invention.

More preferably, the at least one catalyst comprises at least one compound selected from the group of nickel and palladium catalysts with ligands selected from the group of tri-tert-butylphosphine, triadamantylphosphine, 1,3-bis(2,4,6-trimethylphenyl)imidazolidinium chloride, 1,3-bis(2,6-diisopropylphenyl)imidazolidinium chloride or 1,3-diadamantylimidazolidinium chloride or mixtures thereof; bis(triphenylphosphino)palladium dichloride ($Pd(PPh_3)Cl_2$), palladium(II) acetate ($Pd(OAc)_2$), tetrakis(triphenylphosphine)palladium ($Pd(PPh_3)_4$), tetrakis(triphenylphosphine)

nickel (Ni(PPh$_3$)$_4$), nickel(II) acetylacetonate Ni(acac)$_2$, dichloro(2,2'-bipyridine)nickel, dibromobis(triphenylphosphine)nickel (Ni(PPh$_3$)$_2$Br$_2$), bis(diphenylphosphino)propanenickel dichloride (Ni(dppp)Cl$_2$) or bis(diphenylphosphino)ethanenickel dichloride Ni(dppe)Cl$_2$ or mixtures thereof.

The amount of the catalyst added often depends on the target molecular weight and is typically within the range of $\geq 0.1$–$\leq 20$ mol %, preferably in the range of $\geq 0.5$–$\leq 17.5$ mol %, more preferably in the range of $\geq 1$–$\leq 15$ mol %, based in each case on the molar amount of the thiophene derivative used.

In a preferred embodiment of the present invention, the concentration of the organometallic thiophene compound in the first solution is $\geq 6\%$ by weight. This has been found to be advantageous in many applications of the present invention.

The concentration of the organometallic thiophene compound in the first solution is $\geq 8\%$ by weight, more preferably $\geq 10\%$ by weight and most preferably $\geq 12\%$ by weight.

In a preferred embodiment of the present invention, the volume ratio (in l/l) of the first and second solution is $\geq 3:1$ to $\leq 20:1$.

In this way, it is surprisingly possible once again to improve the reaction in many applications of the present invention, while at the same time the molecular weight distribution of the resulting poly- or oligothiophenes remains narrow and there is the possibility of increasing the molecular weight.

The volume ratio (in l/l) of the first and of the second solution is preferably $\geq 4:1$ to $\leq 15:1$, more preferably $\geq 5:1$ to $\leq 10:1$.

In a preferred embodiment, the metering time (i.e. the time within which the first solution is added fully to the second solution) is $$t = \frac{500}{k} \frac{\text{Min}}{m} * \frac{V_{reactor}}{A_{reactor}} \frac{m^3}{m^2}$$

where k is $\geq 0.2$ to $\leq 5$, preferably $\geq 1$ to $\leq 4$, more preferably $\geq 1$ to $\leq 3$. "$V_{reactor}$" means the volume, "$A_{reactor}$" the heat exchange area, of the vessel in which the reaction takes place.

This has been found to be advantageous for many applications within the present invention, since the reaction can thus be conducted with even better control. Preference is given to using a stirred tank apparatus with an aspect ratio of about 1.

General group definitions: Within the description and the claims, general groups, for example: alkyl, alkoxy, aryl, etc., are claimed and described. Unless stated otherwise, the following groups within the groups described in general are used with preference in the context of the present invention:

alkyl: linear and branched C1-C8-alkyls,
long-chain alkyls: linear and branched C5-C20 alkyls,
alkenyl: C2-C8-alkenyl,
cycloalkyl: C3-C8-cycloalkyl,
alkoxy: C1-C6-alkoxy,
long-chain alkoxy: linear and branched C5-C20 alkoxy,
alkylene: selected from the group comprising:
methylene; 1,1-ethylene; 1,2-ethylene; 1,1-propylidene; 1,2-propylene; 1,3-propylene; 2,2-propylidene; butan-2-ol-1,4-diyl; propan-2-ol-1,3-diyl; 1,4-butylene; cyclohexane-1,1-diyl; cyclohexane-1,2-diyl; cyclohexane-1,3-diyl; cyclohexane-1,4-diyl; cyclopentane-1,1-diyl; cyclopentane-1,2-diyl; and cyclopentane-1,3-diyl,
aryl: selected from aromatics having a molecular weight below 300 Da,
arylene: selected from the group comprising: 1,2-phenylene; 1,3-phenylene; 1,4-phenylene; 1,2-naphthalenylene; 1,3-naphthalenylene; 1,4-naphthalenylene; 2,3-naphthalenylene; 1-hydroxy-2,3-phenylene; 1-hydroxy-2,4-phenylene; 1-hydroxy-2,5-phenylene; and 1-hydroxy-2,6-phenylene,
heteroaryl: selected from the group comprising: pyridinyl; pyrimidinyl; pyrazinyl; triazolyl; pyridazinyl; 1,3,5-triazinyl; quinolinyl; isoquinolinyl; quinoxalinyl; imidazolyl; pyrazolyl; benzimidazolyl; thiazolyl; oxazolidinyl; pyrrolyl; thiophenyl; carbazolyl; indolyl; and isoindolyl, where the heteroaryl may be bonded to the compound via any atom in the ring of the selected heteroaryl,
heteroarylenes: selected from the group comprising: pyridinediyl; quinolinediyl; pyrazodiyl; pyrazolediyl; triazolediyl; pyrazinediyl, thiophenediyl; and imidazolediyl, where the heteroarylene functions as a bridge in the compound via any atom in the ring of the selected heteroaryl; especially preferred are: pyridine-2,3-diyl; pyridine-2,4-diyl; pyridine-2,5-diyl; pyridine-2,6-diyl; pyridine-3,4-diyl; pyridine-3,5-diyl; quinoline-2,3-diyl; quinoline-2,4-diyl; quinoline-2,8-diyl; isoquinoline-1,3-diyl; isoquinoline-1,4-diyl; pyrazole-1,3-diyl; pyrazole-3,5-diyl; triazole-3,5-diyl; triazole-1,3-diyl; pyrazine-2,5-diyl; and imidazole-2,4-diyl, thiophene-2,5-diyl, thiophene-3,5-diyl; a C1-C6-heterocycloalkyl, selected from the group comprising: piperidinyl; piperidine; 1,4-piperazine, tetrahydrothiophene; tetrahydrofuran; 1,4,7-triazacyclononane; 1,4,8,11-tetraazacyclotetradecane; 1,4,7,10,13-pentaazacyclopentadecane; 1,4-diaza-7-thiacyclononane; 1,4-diaza-7-oxa-cyclononane; 1,4,7,10-tetraazacyclododecane; 1,4-dioxane; 1,4,7-trithiacyclononane; pyrrolidine; and tetrahydropyran, where the heteroaryl may be bonded to the C1-C6-alkyl via any atom in the ring of the selected heteroaryl,
heterocycloalkylenes: selected from the group comprising: piperidin-1,2-ylene; piperidin-2,6-ylene; piperidin-4,4-ylidene; 1,4-piperazin-1,4-ylene; 1,4-piperazin-2,3-ylene; 1,4-piperazin-2,5-ylene; 1,4-piperazin-2,6-ylene; 1,4-piperazin-1,2-ylene; 1,4-piperazin-1,3-ylene; 1,4-piperazin-1,4-ylene; tetrahydrothiophen-2,5-ylene; tetrahydrothiophen-3,4-ylene; tetrahydrothiophen-2,3-ylene; tetrahydrofuran-2,5-ylene; tetrahydrofuran-3,4-ylene; tetrahydrofuran-2,3-ylene; pyrrolidin-2,5-ylene; pyrrolidin-3,4-ylene; pyrrolidin-2,3-ylene; pyrrolidin-1,2-ylene; pyrrolidin-1,3-ylene; pyrrolidin-2,2-ylidene; 1,4,7-triazacyclonon-1,4-ylene; 1,4,7-triazacyclonon-2,3-ylene; 1,4,7-triazacyclonon-2,9-ylene; 1,4,7-triazacyclonon-3,8-ylene; 1,4,7-triazacyclonon-2,2-ylidene; 1,4,8,11-tetraazacyclotetradec-1,4-ylene; 1,4,8,11-tetraazacyclotetradec-1,8-ylene; 1,4,8,11-tetraazacyclotetradec-2,3-ylene; 1,4,8,11-tetraazacyclotetradec-2,5-ylene; 1,4,8,11-tetraazacyclotetradec-1,2-ylene; 1,4,8,11-tetraazacyclotetradec-2,2-ylidene; 1,4,7,10-tetraazacyclododec-1,4-ylene; 1,4,7,10-tetraazacyclododec-1,7-ylene; 1,4,7,10-tetraazacyclododec-1,2-ylene; 1,4,7,10-tetraazacyclododec-2,3-ylene; 1,4,7,10-tetraazacyclododec-2,2-ylidene; 1,4,7,10,13-pentaazacyclopentadec-1,4-ylene; 1,4,7,10,13-pentaazacyclopentadec-1,7-ylene; 1,4,7,10,13-pentaazacyclopentadec-2,3-ylene; 1,4,7,10,13-pentaazacyclopentadec-1,2-ylene; 1,4,7,10,13-pentaazacyclopentadec-2,2-ylidene; 1,4-diaza-7-thia-cyclonon-1,4-ylene; 1,4-diaza-7-thia-cyclonon-1,2-ylene; 1,4-diaza-7-thia-cyclonon-2,3-ylene; 1,4-diaza-7-thia-cyclonon-6,8-ylene; 1,4-diaza-7-thia-cyclonon-2,2-ylidene;

1,4-diaza-7-oxacyclonon-1,4-ylene; 1,4-diaza-7-oxa-cyclonon-1,2-ylene; 1,4-diaza-7-oxa-cyclonon-2,3-ylene; 1,4-diaza-7-oxa-cyclonon-6,8-ylene; 1,4-diaza-7-oxa-cyclonon-2,2-ylidene; 1,4-dioxan-2,3-ylene; 1,4-dioxan-2,6-ylene; 1,4-dioxan-2,2-ylidene; tetrahydropyran-2,3-ylene; tetrahydropyran-2,6-ylene; tetrahydropyran-2,5-ylene; tetrahydropyran-2,2-ylidene; 1,4,7-trithiacyclonon-2,3-ylene; 1,4,7-trithiacyclonon-2,9-ylene; and 1,4,7-trithiacyclonon-2,2-ylidene, heterocycloalkyl: selected from the group comprising: pyrrolinyl; pyrrolidinyl; morpholinyl; piperidinyl; piperazinyl; hexamethylene imine; 1,4-piperazinyl; tetrahydrothiophenyl; tetrahydrofuranyl; 1,4,7-triazacyclononanyl; 1,4,8,11-tetraazacyclotetradecanyl; 1,4,7,10,13-pentaazacyclopentadecanyl; 1,4-diaza-7-thia-cyclononanyl; 1,4-diaza-7-oxa-cyclononanyl; 1,4,7,10-tetraazacyclododecanyl; 1,4-dioxanyl; 1,4,7-trithiacyclononanyl; tetrahydropyranyl; and oxazolidinyl, where the heterocycloalkyl may be bonded to the compound via any atom in the ring of the selected heterocycloalkyl, halogen: selected from the group comprising: F; Cl; Br and I, haloalkyl: selected from the group comprising mono-, di-, tri-, poly- and perhalogenated linear and branched C1-C8-alkyl, pseudohalogen: selected from the group comprising —CN, —SCN, —OCN, N3, —CNO, —SeCN.

Unless stated otherwise, the following groups are more preferred groups within the general group definitions:

alkyl: linear and branched C1-C6-alkyl, long-chain alkyls: linear and branched C5-C10 alkyl, preferably C6-C8 alkyls, alkenyl: C3-C6-alkenyl, cycloalkyl: C6-C8-cycloalkyl, alkoxy: C1-C4-alkoxy, long-chain alkoxy: linear and branched C5-C10 alkoxy, preferably linear C6-C8 alkoxy, alkylene: selected from the group comprising: methylene; 1,2-ethylene; 1,3-propylene; butan-2-ol-1,4-diyl; 1,4-butylene; cyclohexane-1,1-diyl; cyclohexane-1,2-diyl; cyclohexane-1,4-diyl; cyclopentane-1,1-diyl; and cyclopentane-1,2-diyl, aryl: selected from the group comprising: phenyl; biphenyl; naphthalenyl; anthracenyl; and phenanthrenyl, arylene: selected from the group comprising: 1,2-phenylene; 1,3-phenylene; 1,4-phenylene; 1,2-naphthalenylene; 1,4-naphthalenylene; 2,3-naphthalenylene and 1-hydroxy-2,6-phenylene, heteroarylene: thiophene, pyrrole, pyridine, pyridazine, pyrimidine, indole, thienothiophene, halogen: selected from the group comprising: Br and Cl, more preferably Br.

In a preferred embodiment of the invention, the at least one thiophene derivative comprises at least one compound of the general formula:

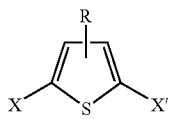

where R is selected from the group comprising hydrogen, hydroxyl, halogen, pseudohalogen, formyl, carboxyl and/or carbonyl derivatives, alkyl, long-chain alkyl, alkoxy, long-chain alkoxy, cycloalkyl, haloalkyl, aryl, arylene, haloaryl, heteroaryl, heteroarylene, heterocycloalkylene, heterocycloalkyl, haloheteroaryl, alkenyl, haloalkenyl, alkynyl, haloalkynyl, keto, ketoaryl, haloketoaryl, ketoheteroaryl, ketoalkyl, haloketoalkyl, ketoalkenyl, haloketoalkenyl, phosphoalkyl, phosphonates, phosphates, phosphine, phosphine oxide, phosphoryl, phosphoaryl, sulphonyl, sulphoalkyl, sulphoarenyl, sulphonate, sulphate, sulphone, amine, polyether, silylalkyl, silylalkyloxy, where, in the case of suitable radicals, one or more nonadjacent $CH_2$ groups may independently be replaced by —O—, —S—, —NH—, —NR—, —SiRR—, —CO—, —COO—, —OCO—, —OCO—O—, —$SO_2$—, —S—CO—, —CO—S—, —$CY^1$=$CY^2$ or —C≡C—, and in such a way that oxygen and/or sulphur atoms are not bonded directly to one another (terminal $CH_3$ groups are interpreted as $CH_2$ groups in the sense of $CH_2$—H) and where X and X' are each independently a leaving group, preferably halogen, more preferably Cl, Br or I and especially preferably Br.

In a preferred embodiment of the present invention, the first and/or the second solution comprises a solvent selected from the group of aliphatic hydrocarbons, for example alkanes, especially pentane, hexane, cyclohexane or heptane, unsubstituted or substituted aromatic hydrocarbons, for example benzene, toluene and xylenes, and compounds containing ether groups, for example diethyl ether, tert-butyl methyl ether, dibutyl ether, amyl ethers, dioxane and tetrahydrofuran (THF), and solvent mixtures of the aforementioned groups.

In the process according to the invention, preference is given to using solvents which contain ether groups. Very particular preference is given to tetrahydrofuran. However, it is also possible and preferred for numerous working examples of the present invention to use mixtures of two or more of these solvents as the solvent. For example, it is possible to use mixtures of the tetrahydrofuran solvent used with preference and alkanes, for example hexane (for example present in commercially available solutions of starting materials such as organometallic compounds). What is important in the context of the invention is that the solvent, the solvents or the mixtures thereof are selected such that the thiophene derivatives used or the polymerization-active monomers are present in dissolved form in the first solution. Also suitable for the workup are halogenated aliphatic hydrocarbons such as methylene chloride and chloroform.

In a preferred embodiment of the process according to the invention, the reaction is ended ("quenched") by adding a hydrolyzing solvent to the polymerization solution, preferably an alkyl alcohol, more preferably ethanol or methanol, most preferably methanol.

The workup is effected preferably by filtering off the precipitated product, washing it with the precipitant and then taking it up in a solvent.

Alternatively and likewise preferably, a purification can be effected in a Soxhlet, in which case preference is given to using nonpolar solvents, for example hexane, as the extractant.

In a preferred embodiment of the invention, the process is used to prepare copolymers and/or block polymers.

For the preparation of copolymers and/or block polymers, but also for larger homogeneous polymers, in a preferred embodiment of the invention, first the first and second solution are reacted in the process according to the invention, then at least one further solution consisting of polymerization-active thiophene monomer and/or two solutions consisting of a) at least one thiophene monomer with two leaving groups and b) a metal or an organometallic compound are metered in with the purpose of chain extension on the basis of the same thiophene derivative and/or of at least one other thiophene derivative to prepare block copolymers or copolymers.

The process according to the invention serves to prepare poly- and oligothiophenes. Preference is given to the preparation of degrees of polymerization or numbers of repeat units n in the chain of $\geq 2$ to $\leq 5000$, especially of $\geq 5$ to $\leq 2500$, more preferably of $\geq 100$ to $\leq 1000$.

Depending on the molecular weight of the monomeric thiophene derivative, the molecular weight is $\geq 1000$ to $\leq 300\,000$, preferably $\geq 2000$ to $\leq 100\,000$, more preferably $\geq 5000$ to $\leq 80\,000$, especially preferably $\geq 10\,000$ to $\leq 60\,000$.

In the case of oligothiophenes, preference is given to the preparation of chain lengths with $n \geq 2$ to $\leq 20$ monomer units, preferably of $\geq 3$ to $\leq 10$, more preferably of $\geq 4$ to $\leq 8$.

Also preferred is a narrow molecular weight distribution with a polydispersity index PDI of $\geq 1$ to $\leq 3$, preferably PDI$\leq 2$, more preferably PDI$\geq 1.1$ to $\leq 1.7$.

The polymers and oligomers prepared by the process are additionally notable, in many embodiments, for the presence of one or two leaving groups at the chain end, which can serve later as substitution sites for functionalizations or end-capping reactions.

For a preferred embodiment of the present invention, after performing the polymerization but before the workup (especially the quenching), reaction is effected with a thiophene derivative having only one leaving group. This can achieve a so-called end-capping. The thiophene derivative having only one leaving group preferably possesses a radical which can be functionalized further, preferably in the 5 position, which is preferably selected from the group of phosphoalkyl, phosphonate, phosphate, phosphine, phosphine oxide, phosphoryl, phosphoaryl, sulphonyl, sulphoalkyl, sulphoarenyl, sulphonate, sulphate, sulphone or mixtures thereof. This has been found to be advantageous for many applications of the present invention.

Temperatures suitable for the performance of the process according to the invention are, in a preferred embodiment of the invention, in the range of $\geq +20$ to $\leq +200°$ C., preferably in the range of $\geq +60$ to $\leq +160°$ C. and especially $\geq +80$ to $\leq +140°$ C.

In a preferred embodiment of the invention, the reaction is effected at elevated pressures, preferably at $\geq 1-\leq 30$ bar, especially at $\geq 2-\leq 15$ bar and more preferably in the range of $\geq 4-\leq 10$ bar.

The process according to the invention is notable, in particular, in many applications, for the possibility of controlled establishment of a desired mean chain length, and also for the preparation of products with a narrow molecular weight distribution.

The invention likewise provides the oligothiophenes obtained by the process according to the invention.

The aforementioned components to be used in accordance with the invention, and also those claimed and those described in the working examples, are not subject, in terms of their size, shape configuration, material selection and technical design, to any particular exceptional conditions, such that the selection criterion known in the field of use can be applied without restriction.

Further details, features and advantages of the subject-matter of the invention are evident from the subclaims and from the description of the following working example which follows.

EXAMPLE 1

Example 1 should be understood purely illustratively and does not constitute any restriction of the present invention, which is defined purely by the claims.

a) Preparation of the Organomagnesium Thiophene:

A 150 three-neck flask equipped with a stirrer bar and a reflux condenser is initially charged with 46 ml of ethylmagnesium bromide solution (1M). To this solution are added 15 g (46 mmol) of 2,5-dibromo-3-hexylthiophene, dissolved in 9 ml of THF, at room temperature with stirring.

b) Semicontinuous Polymerization

A 150 three-neck flask, equipped with a stirrer bar and a reflux condenser, is initially charged with 249 mg of Ni(dppp)Cl$_2$ in 6 ml of THF. To this mixture is metered the solution prepared under a) via a dropping funnel under reflux (approx. 68° C.) within 30 min. After the metered addition has ended, the reaction solution is stirred under reflux for a further 1 h.

To end the reaction, 50 ml of methanol are then added. The reaction solution is then added to about 200 ml of methanol. The precipitated polymer is filtered off and washed with methanol. This is followed by a further purification of the polymer by means of a Soxhlet extraction with hexane.

5.8 g of polymer are obtained from the polymerization (yield approx. 75%).

Molar mass (Mn)=12 600

Weight-average molar mass (Mw)=22 200

PDI=1.76

The invention claimed is:

1. Process for polymerization of at least one thiophene derivative having at least two leaving groups, the polymerization proceeding by means of an organometallic thiophene compound and of at least one catalyst, wherein a first solution which comprises the at least one organometallic thiophene compound is metered into a second solution which comprises the at least one catalyst, where the polymer concentration defined by the concentration of the two solutions (at 100% conversion) is $\geq 5\%$ by weight.

2. Process according to claim 1, wherein the concentration of the organometallic thiophene compound in the first solution is $\geq 6\%$ by weight.

3. Process according to claim 1, wherein the volume ratio in l/l of the first and of the second solution is $\geq 3:1$ to $\leq 20:1$.

4. Process according to claim 1, wherein the metering time t within which the first solution is added fully to the second solution is $$t = \frac{500}{k} \frac{\text{Min}}{m} * \frac{V_{reactor}}{A_{reactor}} \frac{m^3}{m^2}$$

where k is $\geq 0.2$ to $\leq 5$ and "$V_{reactor}$" is the volume, "$A_{reactor}$" the heat exchange surface, of the vessel in which the reaction takes place.

5. Process according to claim 1, wherein the at least one thiophene derivative contains at least one leaving group selected from the group of halogens, sulphates, sulphonates and diazo groups.

6. Process according to claim 1, wherein the leaving groups of the at least one thiophene derivative are identical.

7. Process according to claim 1, wherein the organometallic thiophene compound contains at least one metal selected from the group consisting of zinc, magnesium, tin and boron.

8. Process according to claim 1, wherein the at least one catalyst comprises nickel, palladium or both.

9. Process according to claim 1, wherein the at least one thiophene derivative comprises at least one compound of the formula:

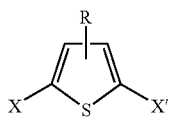

where R is selected from the group consisting of hydrogen, hydroxyl, halogen, pseudohalogen, formyl, carboxyl derivatives, carbonyl derivatives, alkyl, long-chain alkyl, alkoxy, long-chain alkoxy, cycloalkyl, haloalkyl, aryl, arylene, haloaryl, heteroaryl, heteroarylene, heterocycloalkylene, heterocycloalkyl, haloheteroaryl, alkenyl, haloalkenyl, alkynyl, haloalkynyl, keto, ketoaryl, haloketoaryl, ketoheteroaryl, ketoalkyl, haloketoalkyl, ketoalkenyl, haloketoalkenyl, phosphoalkyl, phosphonates, phosphates, phosphine, phosphine oxide, phosphoryl, phosphoaryl, sulphonyl, sulphoalkyl, sulphoarenyl, sulphonate, sulphate, sulphone, amine, polyether, silylalkyl and silylalkyloxy, where, in the case of suitable radicals, one or more nonadjacent $CH_2$ groups may independently be replaced by —O—, —S—, —NH—, —NR—, —SiRR—, —CO—, —COO—, —OCO—, —OCO—O—, —$SO_2$—, —S—CO—, —CO—S—, —$CY^1$=$CY^2$— or —C≡C—, and in such a way that oxygen and/or sulphur atoms are not bonded directly to one another, wherein terminal $CH_3$ groups are interpreted as $CH_2$ groups in the sense of $CH_2$—H and where X and X' are each independently a leaving group.

10. Process according to claim 1, wherein the at least one catalyst comprises at least one compound selected from the group consisting of nickel and palladium catalysts with ligands selected from the group consisting of tri-tert-butylphosphine, triadamantylphosphine, 1,3-bis(2,4,6-trimethylphenyl)imidazolidinium chloride, 1,3-bis(2,6-diisopropylphenyl)-imidazolidinium chloride or 1,3-diadamantylimidazolidinium chloride or mixtures thereof; bis(triphenylphosphino)palladium dichloride ($Pd(PPh_3)Cl_2$), palladium(II) acetate ($Pd(OAc)_2$), tetrakis(triphenylphosphine)palladium ($Pd(PPh_3)_4$), tetrakis(triphenylphosphine) nickel ($Ni(PPh_3)_4$), nickel(II) acetylacetonate $Ni(acac)_2$, dichloro(2,2'-bipyridine)nickel, dibromobis(triphenylphosphine)nickel ($Ni(PPh_3)_2Br_2$) bis(diphenylphosphino)propanenickel dichloride ($Ni(dppp)Cl_2$) or bis(diphenylphosphino)ethanenickel dichloride $Ni(dppe)Cl_2$ and mixtures thereof.

11. Process according to claim 1, wherein said polymerization is performed at $≧+20$ to $≦+200°$ C.

12. Process according to claim 1, wherein said polymerization is performed at $≧1-≦30$ bar.

13. The process of claim 9, wherein said leaving group is Cl, Br or I.

14. The process of claim 13, wherein said leaving group is Br.

* * * * *